(12) United States Patent
Phillips

(10) Patent No.: US 9,711,293 B1
(45) Date of Patent: Jul. 18, 2017

(54) CAPACITOR WITH IONIC-SOLUTION-INFUSED, POROUS, ELECTRICALLY NON-CONDUCTIVE MATERIAL

(71) Applicant: The United States of America, as represented by the Secretary of the Navy, Washington, DC (US)

(72) Inventor: Jonathan Phillips, Pacific Grove, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 148 days.

(21) Appl. No.: 14/850,410

(22) Filed: Sep. 10, 2015

Related U.S. Application Data

(60) Provisional application No. 62/100,789, filed on Jan. 7, 2015.

(51) Int. Cl.
   *H01G 9/04* (2006.01)
   *H01G 9/042* (2006.01)
   *H01G 9/00* (2006.01)
   *H01G 9/145* (2006.01)
   *H01G 9/035* (2006.01)

(52) U.S. Cl.
   CPC ......... *H01G 9/0425* (2013.01); *H01G 9/0036* (2013.01); *H01G 9/035* (2013.01); *H01G 9/145* (2013.01)

(58) Field of Classification Search
   CPC .... H01G 9/0425; H01G 9/0036; H01G 9/035; H01G 9/145
   See application file for complete search history.

(56) References Cited

U.S. PATENT DOCUMENTS 3,345,543 A 10/1967 Sato
3,624,459 A 11/1971 Brown, Jr. et al.
(Continued)

OTHER PUBLICATIONS

Zwilling, V., et al. "Structure and physicochemistry of anodic oxide films on titanium and TA6V alloy." Surface and Interface Analysis 27.7 (1999): 629-637.
(Continued)

*Primary Examiner* — Dion R Ferguson
(74) *Attorney, Agent, or Firm* — Naval Postgraduate School; James B. Potts; Lisa A. Norris

(57) ABSTRACT

A capacitor has two electrodes, one having a porous, electrically non-conductive material formed on a surface of the electrode, for example, by subjecting the conductive material of the first electrode to an anodization process. The porous, electrically non-conductive material is infused with an ionic solution and then covered by the second electrode to form the capacitor. In one implementation, the first electrode is made of titanium, and the porous, electrically non-conductive material is an array of titania tubes that grow perpendicularly from the titanium surface during the anodization process. After infusing the array of titania tubes with a saturated solution of sodium nitrate, the array is covered with a sheet of conductive material that forms the second electrode. The presence of the ionic solution greatly increases the effective dielectric constant of the titania array, thereby greatly increasing the amount of charge that can be stored in the capacitor.

23 Claims, 1 Drawing Sheet

(56) References Cited

U.S. PATENT DOCUMENTS

| | | | |
|---|---|---|---|
| 6,358,391 B1 | 3/2002 | Okabayashi et al. | |
| 7,649,730 B2 | 1/2010 | Jones et al. | |
| 8,824,121 B2 | 9/2014 | Biler et al. | |
| 2006/0098384 A1* | 5/2006 | Takeda | H01G 9/008 361/272 |
| 2006/0174932 A1* | 8/2006 | Usui | B82Y 10/00 136/252 |
| 2009/0214942 A1* | 8/2009 | Frank | H01G 9/048 429/122 |
| 2012/0077095 A1* | 3/2012 | Roumi | H01G 11/02 429/405 |
| 2013/0335885 A1* | 12/2013 | Ginatulin | H01G 11/36 361/511 |
| 2014/0291591 A1* | 10/2014 | Jeon | H01G 9/2031 252/520.2 |

OTHER PUBLICATIONS

Roy, P., et al., "TiO2 nanotubes: synthesis and applications." Angewandte Chemie International Edition 50.13 (2011): 2904-2939.

* cited by examiner

CAPACITOR WITH IONIC-SOLUTION-INFUSED, POROUS, ELECTRICALLY NON-CONDUCTIVE MATERIAL

CROSS-REFERENCE TO RELATED APPLICATIONS

This application claims the benefit of the filing date of U.S. provisional application No. 62/100,789, filed on Jan. 7, 2015, the teachings of which are incorporated herein by reference in their entirety.

BACKGROUND

Field of the Invention

The present invention relates to capacitors.

Description of the Related Art

This section introduces aspects that may help facilitate a better understanding of the invention. Accordingly, the statements of this section are to be read in this light and are not to be understood as admissions about what is prior art or what is not prior art.

A capacitor is an electronic component that stores electrical charge. A conventional parallel-plate capacitor has two parallel electrode plates separated and electrically isolated from one another. It is known to fill the space between the two electrode plates with a dielectric material to increase the amount of electrical charge that can be stored in the capacitor. For many real-world applications, the more charge that a capacitor of a given physical size, can store, the better.

SUMMARY

In one embodiment, the present invention is an article of manufacture comprising a capacitor. The capacitor comprises (i) a first capacitor electrode formed of a first conductive material; (ii) porous, electrically non-conductive material formed on a surface of the first capacitor electrode; (iii) an ionic solution infusing the porous, electrically non-conductive material; and (iv) a second capacitor electrode formed of a second conductive material and mounted onto the solution-infused, porous, electrically non-conductive material.

In another embodiment, the present invention is a method for fabricating the capacitor of the previous paragraph. The method comprises (a) forming the porous, electrically non-conductive material on the surface of the first capacitor electrode; (b) infusing the porous, electrically non-conductive material with the ionic solution; and (c) mounting the second capacitor electrode onto the solution-infused, porous, electrically non-conductive material.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
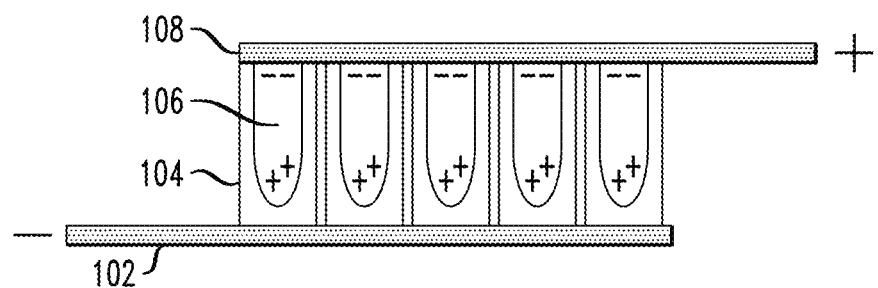
FIG. 1 is a schematic, cross-sectional side view of a capacitor according to one embodiment of the invention.

FIG. 1 is a schematic, cross-sectional side view of a capacitor 100 according to certain embodiments of the invention. Capacitor 100 comprises (i) a first capacitor electrode 102 formed of a first conductive material, (ii) a porous, electrically non-conductive material 104 formed on a surface of the first capacitor electrode 102, (iii) an ionic solution 106 infusing the porous, electrically non-conductive material 104, and (iv) a second capacitor electrode 108 formed of a second conductive material and mounted onto the solution-infused, porous, electrically non-conductive material 104. Note that the mounted second capacitor electrode 108 is in physical contact with the porous, electrically non-conductive material 104.

In particular implementations, the porous, electrically non-conductive material 104 is an array of hollow dielectric tubes formed on and oriented normal to the surface of the first capacitor electrode 102. For example, when the first conductive material of the first capacitor electrode 102 is titanium, the porous, electrically non-conductive material 104 is an array of hollow titania (i.e., titanium oxide) tubes formed, for example, by anodizing the titanium. In one particular implementation, the ionic solution 106 is propylene carbonate containing dissolved sodium nitrate, and the second capacitor electrode 108 is a graphite foil applied directly over the solution-infused array of hollow titania tubes.

As used in this specification, the term "anodization" refers to an electrolytic passivation process used to increase the thickness of the natural oxide layer on the surface of a metal structure. Anodization is typically achieved by placing the metal structure in an electrolytic solution and then applying a voltage differential between the metal structure and another electrode in contact with the electrolytic solution. Note that hollow tubes of electrically non-conductive material may be formed on the surface of a capacitor electrode using techniques other than anodization.

Although capacitor 100 of FIG. 1 has been described in the context of a particular implementation, in general:

The first conductive material of the first capacitor electrode 102 may be any suitable electrically conductive material, such as (i) any form of conductive carbon, including graphite, or (ii) a metal, such as, without limitation, silver, gold, titanium, aluminum, tungsten, zinc, magnesium, niobium, zirconium, hafnium, tantalum, iron, carbon steel and other ferrous metals, and alloys thereof;

The porous, electrically non-conductive material 104 may be any suitable porous, electrically non-conductive material, such as a dielectric oxide of the first conductive material of the first capacitor electrode 102 formed, for example, by anodizing the first conductive material. In some, but not necessarily all, implementations, the porous, electrically non-conductive material 104 comprises an array of hollow, non-electrically conductive tubes oriented normal to the conductive electrode surface;

The ionic solution 106 may be any material that is a polar liquid at ambient conditions with mobile ions suspended or dissolved in the liquid, for example and without limitation, an acid solution, a base solution, an organic electrolyte, or an aqueous solution of water. For example, the ionic solution 106 may be a polar electrolyte commonly used in batteries such as those comprising, without limitation, propylene glycol, ethylene glycol, propylene carbonate, lithium perchlorate, or TPA-$ClO_4$. The mobile ions may be from any suitable material that dissolves in a polar solvent to form charged ions, such as, without limitations, salts; and The second conductive material may be any suitable electrically conductive material, such as, without limitation, a metal or graphite, such as, without limitation, a graphite foil, such as Grafoil® flexible graphite, a product of UCAR Carbon Company (GrafTech International Ltd.) of Parma, Ohio.

Existing anodization technology permits the controlled growth of an array of oriented, hollow, insulating, interconnected, titania (i.e., titanium dioxide) tubes on the surface of a titanium foil. See, e.g., V. Zwilling, E. Darque-Ceretti, A. Boutry-Forveille, D. David, M. Y. Perrin, M. Aucouturier, "Structure and physicochemistry of anodic oxide films on titanium and TA6V alloy," Surface and Interface Analysis 27, 629 (1999), and P. Roy, S. Berger, P. Schmuki, "$TiO_2$ nanotubes: Synthesis and Applications," Angewandte Chemie 50 (International ed. in English), 2904 (2011), the teachings of both of which are incorporated herein by reference.

Figure 2:
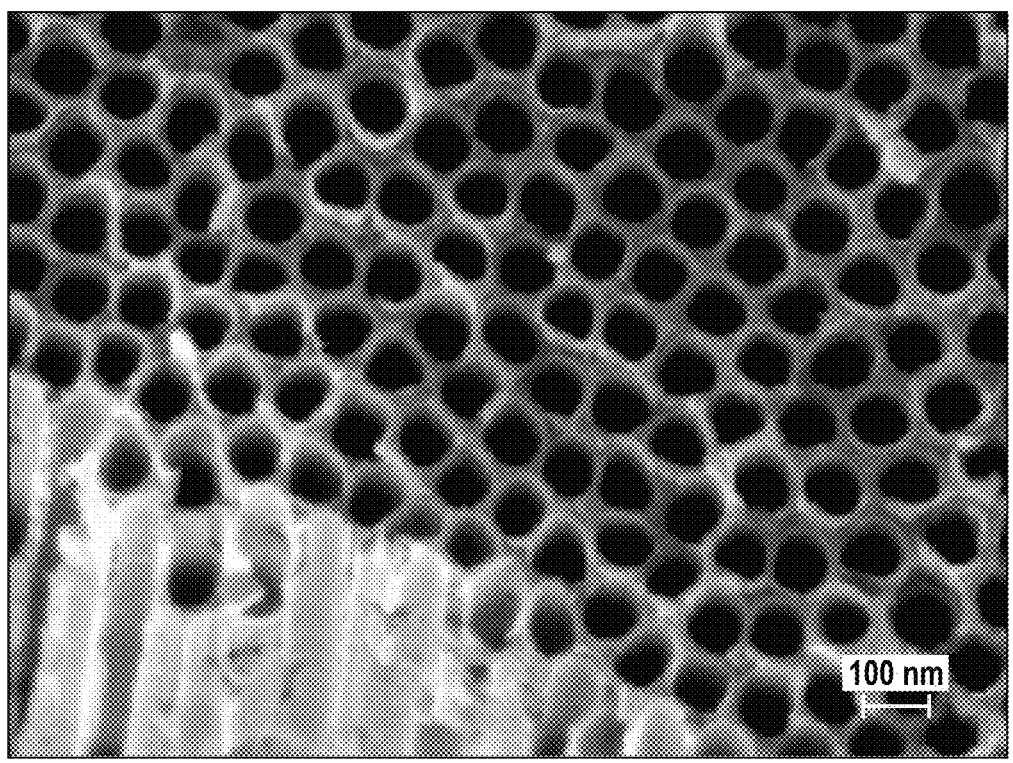
FIG. 2 is a scanning electron microscope photograph showing titania tubes formed by one exemplary anodization process of the invention.

FIG. 2 is a scanning electron microscope photograph showing titania tubes formed by one exemplary anodization process of the invention, in which the titanium foil was anodized in a solution containing 0.25% ammonium fluoride and 2.75% water in ethylene glycol using a titanium cathode and applying a constant DC voltage of 40V for 260 min. The anodized titanium foil was rinsed in ethanol and dried in air before and after the anodization. Subsequent examination using scanning electron microscopy showed that hollow titania ($TiO_2$) tubes of length 10.6 micron and diameter about 100 nm grew in the dense, oriented array shown in FIG. 2 on the surface of the titanium foil. Since the original thickness of the metallic titanium foil was 0.5 mm, only a small fraction was converted into the insulating oxide tubes.

As shown in FIG. 2, the hollow titania tubes are interconnected to form an array of dielectric material on the surface of the titanium foil. The dimensions of the dielectric array (e.g., the length and diameter of the tubes and the thickness of the interconnecting walls) can be varied by controlling the duration and level of the voltage applied and the composition of the solution used during the anodization process. It is possible to create a dense array of hollow, electrically insulating titania tubes of very short length (ca. 1 micron), oriented substantially perpendicular to the surface of the underlying titanium foil.

The anodized titanium foil was then placed in a saturated propylene carbonate solution of sodium nitrate for 50 min at room temperature. This process fills the tubes with the saturated ionic solution.

A square sheet of graphite foil (i.e., compressed natural graphite, 99.99% carbon) measuring 1.75 mm on a side and 0.3 mm thick was placed on top of the open ends of the salt-water-infused array of titania tubes to complete the capacitor 100 of FIG. 1.

FIG. 1 indicates the ion separation that occurs within the drops of salt water 106 when a voltage differential is applied across the two capacitor electrodes 102 and 108. In this particular case, a negative voltage is applied to the titanium electrode 102, and a positive voltage is applied to the graphite foil electrode 108, resulting in positive sodium ions being attracted to the negatively charged titanium electrode 102 and negative chlorine ions being attracted to the positively charged graphite foil electrode 108. This ion separation greatly increases the effective dielectric constant of the resulting dielectric material located between the two capacitor electrodes, thereby greatly increasing the amount of charge that can be stored in the capacitor 100 as compared to conventional capacitors of the same physical size.

Examples of capacitor 100 of FIG. 1 having (i) a titanium foil first electrode 102, (ii) an array of hollow titania tubes 104 perpendicular to the first electrode surface, about 90 nm diameter, and of length equal to the thickness of the oxidized layer, (iii) a saturated $NaNO_3$ aqueous solution 106, and (iv) a graphite foil second electrode 108 were found to have dielectric constants greater than $10^7$ at ~0 Hz, a maximum operating voltage of greater than 2 volts, and energy density as high as 215 $J/cm^3$, which surpasses the highest previously reported energy densities for electrostatic capacitors by approximately one order of magnitude (e.g., ~10 $J/cm^3$ for the best traditional barium titanate-based capacitors and ~25 $J/cm^3$ for the best new polymer-based dielectric capacitors).

Although the anodization process described above generates an array of dielectric tubes as shown in FIG. 2, other anodization processes generate other results, including, for example, a dense, rather randomly oriented, insulating structure having hollow pores that can be infused with an ionic solution.

In the embodiment of FIG. 1, capacitor 100 is a parallel-plate capacitor in which the first and second capacitor electrodes 102 and 108 are flat structures. In theory, it may be possible to implement the invention as non-parallel-plate capacitors having capacitor electrodes that are non-flat structures. For example, as is common in industrial practice with other types of dielectric capacitors, the original, flat, parallel plate configuration can be rolled up to form a "jellyroll" configuration.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A capacitor comprising:
   a first capacitor electrode comprising a first conductive material;
   a second capacitor electrode formed of a second conductive material; and
   a dielectric between the first capacitor electrode and the second capacitor electrode, wherein the dielectric has a dielectric constant greater than $10^7$, and the dielectric comprising:
      an array of electrically non-conductive tubes oriented normal to the surface of the first capacitor electrode, where every individual electrically non-conductive tube comprises a metal oxide, and where the every individual electrically non-conductive tube comprises a closed end and an open end, and where the closed end is in contact with the first capacitor electrode and the open end is in contact with the second capacitor electrode; and
      an ionic solution filling each electrically non-conductive tube and in contact with the second capacitor electrode, where the ionic solution comprises a solvent and a solute where the solvent is a polar liquid and the solute comprises positive ions and negative ions.

2. The capacitor of claim 1, wherein:
   the first conductive material comprises a metal; and
   the metal oxide comprises a metal oxide of the first conductive material.

3. The capacitor article of claim 2, wherein:
   the first conductive material comprises titanium; and
   the metal oxide comprises titania.

4. The capacitor of claim 1, wherein the ionic solution is a polar solvent comprising dissolved salt.

5. The capacitor of claim 4, wherein the polar solvent is propylene carbonate.

6. The capacitor of claim 5, wherein the salt comprises sodium nitrate.

7. The capacitor of claim 4, wherein the polar solvent is water.

8. The capacitor of claim 4, wherein the polar solvent is propylene glycol.

9. The capacitor of claim 1, wherein the second conductive material comprises graphite.

10. The capacitor of claim 9, wherein the second conductive material is a graphite foil.

11. The capacitor of claim 1, wherein:
    the first and second capacitor electrodes are flat structures; and
    the capacitor is a parallel-plate capacitor.

12. A method for fabricating the capacitor of claim 1, the method comprising:
    (a) forming the array of electrically non-conductive tubes on the surface of the first capacitor electrode;
    (b) filling the array of electrically non-conductive tubes with the ionic solution; and
    (c) mounting the second capacitor electrode onto the open end of the every individual electrically non-conductive tube.

13. The method of claim 12, wherein:
    the first conductive material comprises a metal; and
    the metal oxide comprises a metal oxide of the first conductive material.

14. The method of claim 13, wherein:
    the first conductive material comprises titanium; and
    the metal oxide comprises titania.

15. The method of claim 12, wherein the ionic solution is a polar solvent comprising dissolved salt.

16. The method of claim 15, wherein:
    the polar solvent is propylene carbonate; and
    the salt comprises sodium nitrate.

17. The method of claim 12, wherein the second conductive material comprises graphite.

18. The method of claim 17, wherein the second conductive material is a graphite foil.

19. The method of claim 12, wherein:
    the first and second capacitor electrodes are flat structures; and
    the capacitor is a parallel-plate capacitor.

20. The capacitor of claim 1 where the positive ions and negative ions are not an ion of an atom comprising the metal oxide.

21. A capacitive system comprising:
    a first capacitor electrode comprising a first conductive material;
    a second capacitor electrode formed of a second conductive material, and a voltage between the first capacitor electrode and the second capacitor electrode;

a dielectric between the first capacitor electrode and the second capacitor electrode, the dielectric having a dielectric constant and the dielectric comprising:

an array of electrically non-conductive tubes oriented normal to the surface of the first capacitor electrode, where every individual electrically non-conductive tube comprises a metal oxide, and where the every individual electrically non-conductive tube comprises a closed end and an open end, and where the closed end is in contact with the first capacitor electrode and the open end is in contact with the second capacitor electrode; and an ionic solution filling each electrically non-conductive tube and in contact with the second capacitor electrode, where the ionic solution comprises a solvent and a solute where the solvent is a polar liquid and the solute comprises positive ions and negative ions, where the positive ions and negative ions are not an ion of an atom comprising the metal oxide; and a voltage from the first capacitor electrode to the second capacitor electrode and the voltage generating a separation between the positive ions and the negative ions and increasing the dielectric constant of the dielectric to greater than $10^7$.

22. The capacitive system of claim 21 where the voltage between the first capacitor electrode and the second capacitor electrode is greater than 2 volts.

23. The capacitive system of claim 22 where the positive ions and the negative ions are present in the ionic solution at a concentration equal to at least a molarity produced by saturating an aqueous solution with $NaNO_3$.

* * * * *